C. D. RUSSELL.
NUT LOCK.
APPLICATION FILED MAR. 18, 1909.
960,040.
Patented May 31, 1910.
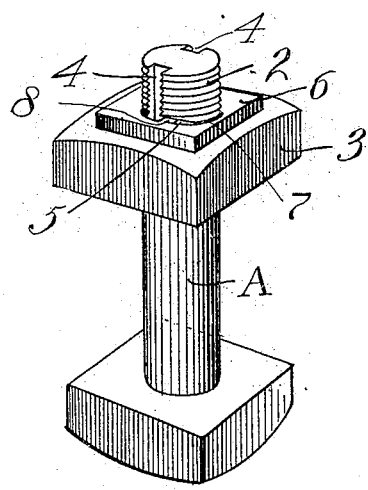
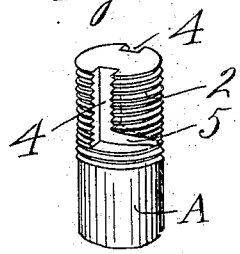
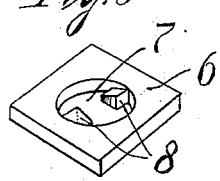
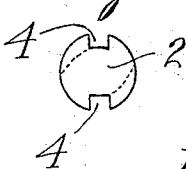
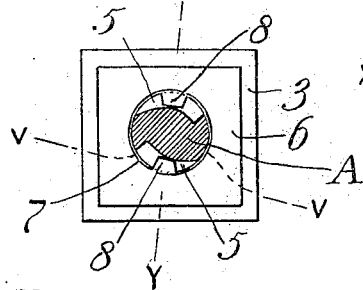
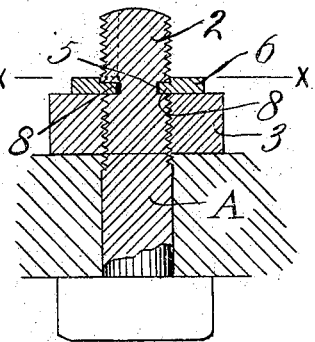
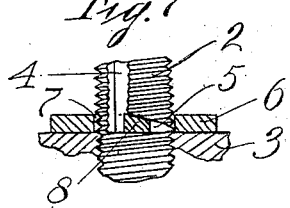
Witnesses,
George Voelker
H. Smith
Inventor,
Charles D. Russell
by Lothrop & Johnson
his Attorneys.
ANDREW B. GRAHAM CO., PHOTO-LITHOGRAPHERS, WASHINGTON, D.C.

UNITED STATES PATENT OFFICE.

CHARLES D. RUSSELL, OF ST. PAUL, MINNESOTA.

NUT-LOCK.

960,040.  Specification of Letters Patent.  Patented May 31, 1910.

Application filed March 18, 1909. Serial No. 484,091.

*To all whom it may concern:*

Be it known that I, CHARLES D. RUSSELL, a citizen of the United States, residing at St. Paul, in the county of Ramsey and State of Minnesota, have invented certain new and useful Improvements in Nut-Locks, of which the following is a specification.

My invention relates to improvements in nut locks, its object being to provide a particularly simple and cheap construction of lock for securing a nut in set position upon a bolt.

To this end my invention consists in the features of construction, combination and arrangement of parts hereinafter particularly described and claimed.

In the accompanying drawings forming part of this specification, Figure 1 is a perspective view of my invention applied to a nut and bolt; Fig. 2 is a similar view of the threaded end of the bolt; Fig. 3 is a cross section of the bolt taken on line $y$—$y$ of Fig. 4; Fig. 4 is a section on line $x$—$x$ of Fig. 3; Fig. 5 is an end view of the threaded end of the bolt. Fig. 6 is a perspective view of the lock, and Fig. 7 is a side elevation showing the locking plate in section.

In the drawings A represents a bolt and 2 the threaded end thereof.

3 represents an ordinary nut interiorly threaded to engage with the threads of the bolt. The threaded end of the bolt is formed upon opposite sides with longitudinally extending grooves 4 extending through the threads at the end of the bolt. The inner end of each groove is formed with a portion 5 extending around the bolt with its upper wall inclined oppositely to the pitch of the threads.

6 represents a plate having a central opening 7 into which extend the oppositely disposed lugs 8. The lugs 8 are fitted to enter the grooves 4 so that the plate may be slipped over the end of the bolt with the lugs extending into the grooves, the plate being forced inwardly upon the bolt and rotated to carry the lugs into the laterally extending portions 5 of the grooves as indicated in Fig. 1. In this position the plate forms an abutment preventing unscrewing of the nut, so that in order to remove the nut it will be necessary to first remove the plate. The upper edge of the lugs 8 are beveled to conform to the inclined upper wall of the groove portions 5 so as to form a better grip for the lugs as indicated in Fig. 7.

As will be evident from Fig. 7 of the drawings the projection 8 as it enters the groove 5 is thinner than said groove so as to enter said groove with vertical play and thus wedge tightly therein.

I claim as my invention:

1. In combination with a threaded bolt formed through its threads with a longitudinal open ended groove said groove being formed at its inner end with a laterally extending portion the upper wall of said laterally extending portion being inclined oppositely to the pitch of the bolt threads, and a plate formed with an opening to receive said bolt and with a projection fitted to said groove, said projection being thin enough to enter the laterally extending portion of said groove with vertical play.

2. In combination, a threaded bolt formed with longitudinally extending grooves at one end, said grooves being formed at their inner ends with laterally extending portions, the upper walls of said laterally extending portions being inclined oppositely to the pitch of the bolt threads, and a plate formed with an opening to receive said bolt and with projections fitted to said grooves, the tops of said projections being beveled for the purpose set forth.

In testimony whereof I affix my signature in presence of two witnesses.

CHARLES D. RUSSELL.

Witnesses:
H. SMITH,
ARTHUR P. LOTHROP.